US008129472B2

(12) United States Patent
Turner et al.

(10) Patent No.: US 8,129,472 B2
(45) Date of Patent: Mar. 6, 2012

(54) POLYOLEFIN COMPOSITIONS, ARTICLES MADE THEREFROM AND METHODS FOR PREPARING THE SAME

(75) Inventors: Michael D. Turner, Hurricane, WV (US); Mridula (Babli) Kapur, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 241 days.

(21) Appl. No.: 12/296,147

(22) PCT Filed: Apr. 3, 2007

(86) PCT No.: PCT/US2007/008425
§ 371 (c)(1),
(2), (4) Date: Oct. 6, 2008

(87) PCT Pub. No.: WO2007/117520
PCT Pub. Date: Oct. 18, 2007

(65) Prior Publication Data
US 2009/0283939 A1 Nov. 19, 2009

Related U.S. Application Data

(60) Provisional application No. 60/790,255, filed on Apr. 7, 2006.

(51) Int. Cl.
*C08L 23/00* (2006.01)
*C08L 23/04* (2006.01)
*C08L 23/10* (2006.01)
(52) U.S. Cl. ........................................ 525/191; 525/240
(58) Field of Classification Search .................. 525/191, 525/240
See application file for complete search history.

(56) References Cited

U.S. PATENT DOCUMENTS

| | | |
|---|---|---|
| 3,645,992 A | 2/1972 | Elston |
| 4,076,698 A | 2/1978 | Anderson et al. |
| 4,101,445 A | 7/1978 | Levine et al. |
| 4,302,565 A | 11/1981 | Goeke et al. |
| 4,461,873 A | 7/1984 | Bailey et al. |
| 4,482,687 A | 11/1984 | Noshay et al. |
| 4,508,842 A | 4/1985 | Beran et al. |
| 4,525,322 A | 6/1985 | Page et al. |
| 4,543,399 A | 9/1985 | Jenkins, III et al. |
| 4,550,143 A | 10/1985 | Tanaka et al. |
| 4,588,790 A | 5/1986 | Jenkins, III et al. |
| 4,603,173 A | 7/1986 | Mack et al. |
| 4,617,352 A | 10/1986 | Page et al. |
| 4,621,952 A | 11/1986 | Aronson |
| 4,937,299 A | 6/1990 | Ewen et al. |
| 5,106,926 A | 4/1992 | Eisinger et al. |
| 5,206,075 A | 4/1993 | Hodgson, Jr. |
| 5,241,031 A | 8/1993 | Mehta |
| 5,272,236 A | 12/1993 | Lai et al. |
| 5,278,272 A | 1/1994 | Lai et al. |
| 5,290,745 A | 3/1994 | Jorgensen et al. |
| 5,310,834 A | 5/1994 | Katzen et al. |
| 5,317,036 A | 5/1994 | Brady, III et al. |
| 5,332,793 A | 7/1994 | Cann |
| 5,342,907 A | 8/1994 | Cann et al. |
| 5,352,749 A | 10/1994 | DeChellis et al. |
| 5,410,003 A | 4/1995 | Bai |
| 5,494,965 A * | 2/1996 | Harlin et al. ............... 525/52 |
| 5,527,752 A | 6/1996 | Reichle et al. |
| 5,688,865 A | 11/1997 | Ali et al. |
| 6,054,544 A | 4/2000 | Finlayson et al. |
| 6,090,893 A | 7/2000 | Harlin et al. |
| 6,187,866 B1 | 2/2001 | Jorgensen et al. |
| 6,194,520 B1 | 2/2001 | Cheruvu et al. |
| 6,248,831 B1 | 6/2001 | Maheshwari et al. |
| 6,316,546 B1 | 11/2001 | Ong et al. |
| 6,335,410 B1 | 1/2002 | Finlayson et al. |
| 6,433,095 B1 | 8/2002 | Laurent et al. |
| 6,458,911 B1 | 10/2002 | Ong et al. |
| 6,511,935 B2 | 1/2003 | Job |
| 6,541,581 B1 | 4/2003 | Follestad et al. |
| 6,649,698 B1 | 11/2003 | Mehta |
| 6,723,810 B2 | 4/2004 | Finlayson et al. |

(Continued)

FOREIGN PATENT DOCUMENTS

EP 0100843 B1 2/1984

(Continued)

OTHER PUBLICATIONS

Williams, T., and I M. Ward. "The Construction of a Polyethylene Calibration Curve for Gel Permeation Chromatography Using Polystyrene Fractions." *Polymer Letters*. vol. 6. 1968. 621-24.

Yau, Wallace W., & Gillespie, David (2001). New Approches Using MW-Sensitive Detectors in GPC-TREF for Polyolefin Characterization. *Polymer 42*. 8947-8958.

Balke, S., Thitiratsakul, R., Lew, R., Cheung, P. & Mourey, T., (1992). A Strategy for Interpreting Multidetector Size-Exclusion Chromatography Data II. *Chromatography of Polymers*, Chapter 13, 199-219.

Bruno, Zimm. "Apparatus and Methods for Measurement and Interpretation of the Angular Variation of Light Scattering; Perliminary Results on Polystyrene Solutions." *The Journal of Chemical Physics* 16(1948): 1009-1116.

(Continued)

*Primary Examiner* — Nathan M Nutter

(57) ABSTRACT

The invention provides compositions for blow molding applications and other applications, where such compositions comprise a high molecular weight ethylene interpolymer and a low molecular weight ethylene polymer, and where the high molecular weight ethylene interpolymer has a density from 0.920 g/cm$^3$ to 0.950 g/cm$^3$, and an $I_{21}$ from 0.05 to 1 dg/min, and where the low molecular weight ethylene polymer has density from 0.965 g/cm$^3$ to 0.985 g/cm$^3$, and an $I_2$ from 600 to 2000 dg/min. The composition has a density from 0.950 g/cm$^3$ to 0.970 g/cm$^3$, and comprises greater from 45 to 80 weight percent of the high molecular component, and from 20 to 55 weight percent of the low molecular weight component, based on the sum weight of the high molecular weight component and the low molecular weight component. The invention also provides for methods of preparing said compositions and for articles prepared from the same.

33 Claims, No Drawings

U.S. PATENT DOCUMENTS

| | | | |
|---|---|---|---|
| 6,749,914 B2 | 6/2004 | Starita | |
| 6,809,154 B2 | 10/2004 | Lindahl et al. | |
| 6,900,266 B2 * | 5/2005 | Raty | 524/611 |
| 6,946,521 B2 | 9/2005 | Miserque et al. | |
| 7,129,296 B2 | 10/2006 | Van Dun et al. | |
| 7,166,676 B2 | 1/2007 | Jacobsen et al. | |
| 2003/0055176 A1 | 3/2003 | Jacobsen et al. | |
| 2003/0149180 A1 | 8/2003 | Van Dun et al. | |
| 2003/0149181 A1 | 8/2003 | Kolthammer et al. | |
| 2004/0034169 A1 | 2/2004 | Zhou et al. | |
| 2004/0198911 A1 | 10/2004 | Van Dun et al. | |
| 2004/0266966 A1 | 12/2004 | Schramm et al. | |
| 2005/0288443 A1 | 12/2005 | Mavridis et al. | |

FOREIGN PATENT DOCUMENTS

| | | |
|---|---|---|
| EP | 0435624 | 7/1991 |
| EP | 0717055 A2 | 6/1996 |
| EP | 0797621 B1 | 10/1997 |
| EP | 1093658 B1 | 4/2001 |
| EP | 1124868 B1 | 8/2001 |
| EP | 1146077 A | 10/2001 |
| EP | 1169388 B1 | 1/2002 |
| EP | 1201713 A1 | 5/2002 |
| EP | 1204523 B1 | 5/2002 |
| EP | 1319685 A1 | 6/2003 |
| EP | 1330490 | 7/2003 |
| EP | 1333040 A2 | 8/2003 |
| EP | 1359192 A1 | 11/2003 |
| EP | 1384751 A1 | 1/2004 |
| EP | 1595897 A1 | 11/2005 |
| JP | 11-080259 | 3/1999 |
| JP | 2001226496 A | 8/2001 |
| WO | WO-90/03414 A1 | 4/1990 |
| WO | WO-93/03093 | 2/1993 |
| WO | WO-95/11264 | 4/1995 |
| WO | WO-95/18677 | 7/1995 |
| WO | WO-99/40131 | 8/1999 |
| WO | WO-99/65039 | 12/1999 |
| WO | WO-00/18813 | 4/2000 |
| WO | WO-00/22040 | 4/2000 |
| WO | WO-00/60001 | 10/2000 |
| WO | WO-01/05845 | 1/2001 |
| WO | WO-01/14122 | 3/2001 |
| WO | WO-01/79344 | 10/2001 |
| WO | WO-03/093363 | 11/2003 |
| WO | WO-2004/007610 | 1/2004 |
| WO | WO-2004/016688 | 2/2004 |
| WO | WO-2004/048468 | 6/2004 |
| WO | WO-2004/058876 | 7/2004 |
| WO | WO-2004/058877 | 7/2004 |
| WO | WO-2004058878 | 7/2004 |
| WO | WO-2004/101674 | 11/2004 |
| WO | WO-2005/090464 | 9/2005 |
| WO | WO-2005/103100 | 11/2005 |
| WO | WO-2005/121239 | 12/2005 |
| WO | WO-2006/007014 | 1/2006 |
| WO | WO-2006/023057 | 3/2006 |
| WO | WO-2006/096504 | 9/2006 |
| WO | WO-2006/138084 | 12/2006 |

OTHER PUBLICATIONS

Kratochvil, Pavel . *Classical Light Scattering From Polymer Solutions*. Polymer Scienc Library. Ser. 5. Oxford, NY: Elsevier, 1987. 112-37.

Hagstrom, Prediction of melt flow rate (MFR) of bimodal polyethylene based on MFR of their components, Conference of Polymer Processing, Aug. 19-21, 1997, Gotenburg (Sweden).

Haward, Effect of Blending on the Molecular Weight Distribution of Polymers, Journal of polymer Science, 1964, p. 2977-3077, vol. 2-Part A.

Bremner, Melt Flow Index Values and Molecular Weight Distributions of Commercial thermoplastics, J. Appl. Pol. Sci., 1990, p. 1617-1627, vol. 41.

Mayridis, Appraisal of a Molecular Weight Distribution-to-Rheology Conversion Scheme for Linear Polyethylene, J. Appl. Pol. Sci., 1993, p. 299-318, vol. 49.

Attalla, Influence of Molecular Structure on the Extensional Behaviour of Polyethylene Melts, Rheo. Acta, 1983, p. 471-475, vol. 22.

Grein, Melt Viscosity Effects in Ethylene-Propylene Copolymers, Rheo. Acta., 2006, p. 1083-1089, vol. 46.

64847A EP—Opposition by Ineos dated Oct. 19, 2010; 12 pages.

64847A EP—Opposition by Borealis dated Oct. 13, 2010; 15 pages.

64847A EP—Communication from EPO Opposition Division dated Aug. 24, 2011; 3 pages.

64847A EP—Applicants' Response to Opposition dated Jul. 26, 2011; 8 pages.

PCT/ US2007/008425, International Search Report.

PCT/ US2007/008425, International Preliminary Report on Patentability.

PCT/ US2007/008425, Written Opinion of the International Searching Authority.

* cited by examiner

POLYOLEFIN COMPOSITIONS, ARTICLES MADE THEREFROM AND METHODS FOR PREPARING THE SAME

REFERENCE TO PRIOR APPLICATION

This application claims the benefit of U.S. Provisional Application No. 60/790,255, filed on Apr. 7, 2006, incorporated herein, in its entirety, by reference.

The invention relates to ethylene polymer compositions for the fabrication of high density ethylene polymer products, such as blow molded single and multi-layer bottles and containers, fabricated and molded fittings and accessories, and other high density polyethylene products. The compositions provide enhanced processing properties, such as reduced bottle weights and enhanced physical properties, such as improved resin stiffness, with minimal, or no, loss in stress crack resistance and impact resistance.

BACKGROUND OF THE INVENTION

Blow molding products, such as household and industrial containers (for example, plastic food bottles for milk, juice, and water; chemical bottles for detergent and motor oil; and heavy-duty storage drums) have high performance and appearance standards. Blow molding products are typically formed using existing commercial equipment and existing blow molding processing techniques, with no, or minimal, equipment modifications. In addition, fabricators seek to minimize the cycle time to produce a product, and thus increased cycle times are disfavored. Customer requirements for blow molding resins include product consistency, good processability, adequate resin swell, and an optimum balance of top load (stiffness, modulus), environmental stress crack resistance (ESCR) and impact resistance.

Improved resin stiffness will increase the load bearing capacity of blow-molded containers. Thus, light weight blow-molded containers with increased stiffness can be used to replace heavier metal containers. In addition, such lighter weight containers can be stacked more efficiently, resulting in more efficient use of storage space and transportation space.

Environmental stress crack resistance (ESCR) is a measure of the susceptibility of a resin to mechanical failure by cracking. Poor environmental stress crack resistance of high density ethylene polymer, blow molded articles, such as blow molded containers for household and industrial goods, has impeded the use of these containers for such goods. Due to insufficient ESCR, blow molded containers, fabricated from high-density ethylene polymer, may crack before or during storage.

Impact resistance is a measure of the ductility of a container. Containers with poor impact strength will crack or fracture upon being struck by a high force or when dropped from a high elevation. Insufficient impact resistance results in a blow molded container that is too brittle for conventional use.

U.S. Pat. No. 6,194,520 discloses high molecular weight, high density ethylene polymer blends capable of being blow molded, and with excellent processability. The blends have a density of at least about 0.930 g/cc, a flow index (I21) of at least about 2 g/10 min, a melt flow ratio (MFR) of at least about 60, and a polydispersity index of at least about 8. The blends contain at least about 0.3 weight fraction of a relatively high molecular weight (HMW) component having a density of at least about 0.900 g/cc, a flow index or high load melt index (I21) of at least about 0.2 g/10 min, and a flow ratio (FR) at least about 10; and a relatively low molecular weight (LMW) component having a density of at least about 0.930 g/cc, and a melt index (I2) no greater than about 1000 g/10 min.

U.S. Pat. No. 6,316,546 (see also U.S. Pat. No. 6,458,911) discloses relatively high molecular weight, high density ethylene polymers (HMW-HDPE) capable of being formed into thin films of high strength. Such polymers having a density of at least about 0.925 g/cc, a flow index (I21) no higher than about 15 g/10 min, a melt flow ratio (MFR) of at least about 65, and a dynamic elasticity at 0.1 rad./sec of no higher than about 0.7, at a corresponding complex viscosity at 0.1 rad/sec no higher than about 14E5 ($14\times10^5$ poises). The ethylene polymer is a bimodal blend of relatively high molecular weight (HMW) and low molecular weight (LMW) ethylene polymer.

European Patent 1169388B1 (see also WO 00/60001 and U.S. Pat. No. 6,433,095) discloses a high density multimodal polyethylene, having a shear ratio (SR) of 18 or more, and comprising at least 20 weight percent of a high molecular weight fraction, which has a density ($\rho$) of 0.930 g/cm$^3$ or less, and a high load melt index (HLMI) of 0.30 g/10 min or less.

International Publication No. WO 2004/048468 discloses a polyethylene composition comprising 20 to 50 weight percent of a copolymer of ethylene and a C3-C20 alpha-olefin comonomer, and 50 to 80 weight percent of a lower weight average molecular weight ethylene polymer, and where the polyethylenes of the composition together have a density of 935 to 965 kg/m$^3$, a weight average molecular weight of 60,000 to 300,000 g/mol, an $\text{MFR}_{2.16}$, at 190° C., of 0.1 to 10 g/10 min, and a molecular weight distribution (MWD) from 2.5 to 20. The copolymer has a comonomer content of from 0.006 to 9 mole percent, and a degree of branching of 0.03 to 45 branches per 1000 carbons. The ethylene polymer has a density of 939 to 975 kg/m$^3$, and a weight average molecular weight of 20,000 to 200,000 g/mol.

European Application No. 1201713A1 discloses a polyethylene resin comprising a blend from 35 to 49 weight percent of a first polyethylene fraction of high molecular weight, and 51 to 65 weight percent of a second polyethylene fraction of low molecular weight. The first polyethylene fraction comprises a linear low density polyethylene having a density of up to 0.928 g/cm$^3$, and an HLMI of less than 0.6 g/10 min, and the second polyethylene fraction comprises a high density polyethylene having a density of at least 0.969 g/cm$^3$, and an MI2 of greater than 100 g/10 min. The polyethylene resin has a density of greater than 0.951 g/cm$^3$, and an HLMI of from 1 to 100 g/10 min.

U.S. Publication No. 2004/0266966 discloses a polyethylene resin having a multimodal molecular weight distribution, and a density in the range from 0.925 g/ccm to 0.950 g/ccm, a melt index ($I_2$) in the range from 0.05 g/10 min to 5 g/10 min. The polyolefin resin comprises at least one high molecular weight (HMW) ethylene interpolymer and at least a low molecular weight (LMW) ethylene polymer.

U.S. Publication No. 2004/0034169 discloses a polymer composition comprising a low-molecular-weight (LMW) ethylene polymer component and a high-molecular-weight (HMW) ethylene polymer component. Preferably, the LMW polyethylene component and the HMW polyethylene component co-crystallize in the composition such that it exhibits a single peak, or substantially single peak, in a lamella thickness distribution ("LTD") curve. The ethylene polymer for the LMW and the HMW polyethylene components can be either homopolyethylene or ethylene copolymer. Preferably, both components are an ethylene copolymer of the same or different composition (that is, with the same or different comonomers).

U.S. Pat. No. 7,166,676 (see also U.S. Publication No. 2003/0055176) discloses a process for the preparation of blends, including an ethylene copolymer, by copolymerizing ethylene and at least one comonomer, selected from a compound represented by the formula $H_2C=CHR$, wherein R is an alkyl group or an aryl group, or a diene, in the presence of a solid catalyst system comprising a support, a transition metal compound and an activator capable of converting the transition metal compound.

European Patent No. 1093658B1 discloses an insulating composition for communication cables, which a multimodal olefin polymer mixture, obtained by polymerization of at least one α-olefin, in more than one stage, and having a density of about 0.920-0.965 g/cm$^3$, a melt flow rate (MFR2) of about 0.2-5 g/10 min an FRR21/2≧60, and an environmental stress cracking resistance (ESCR), according to ASTM D 1693 (A/10 percent Igepal), of at least 500 hours. The olefin polymer mixture comprises at least a first and a second olefin polymer, of which the first is selected from (a) a low molecular weight olefin polymer with a density of about 0.925-0.975 g/cm$^3$, and a melt flow rate (MFR2) of about 300-20 000 g/10 min, and (b) a high molecular weight olefin polymer with a density of about 0.880-0.950 g/cm$^3$, and a melt flow rate (MFR21) of about 0.5-20 g/10 min.

European Patent Application No. 1359192A1 discloses a polyethylene resin comprising from 44 to 55 weight percent of a high molecular weight polyethylene fraction, and from 45 to 56 weight percent of a low molecular weight polyethylene fraction. The high molecular weight polyethylene fraction comprises a linear low density polyethylene having a density from 0.913 to 0.923 g/cm$^3$, and an HLMI from 0.02 to 0.2 g/10 min; and the low molecular weight polyethylene fraction comprises a high density polyethylene having a density of at least 0.969 g/cm$^3$, and an MI2 of greater than 100 g/10 min.

U.S. Pat. No. 4,461,873 (see also EP0100843B1) discloses ethylene polymer blends of a high molecular weight ethylene polymer, preferably an ethylene-mono-1-olefin copolymer, and a low molecular weight ethylene polymer, preferably an ethylene homopolymer, both preferably with narrow molecular weight distribution and low levels of long chain branching. These resins are useful for the manufacture of film or in blow molding techniques, and the production of pipes and wire coating.

U.S. Pat. No. 6,946,521 discloses a polyethylene resin comprising from 35 to 49 weight percent of a first polyethylene fraction of high molecular weight, and from 51 to 65 weight percent of a second polyethylene fraction of low molecular weight. The first polyethylene having a density of up to 0.930 g/cm$^3$, and an HLMI of less than 0.6 g/10 min, and the second polyethylene fraction comprising a high density polyethylene having a density of at least 0.969 g/cm$^3$, and an MI2 of greater than 10 g/10 min, and the polyethylene resin, having a density of greater than 0.946 g/cm$^3$, an HLMI from 1 to 100 g/10 min, a dynamical viscosity, measured at 0.01 radians/second, greater than 200,000 Pa·s, and a ratio of the dynamical viscosities, measured at, respectively 0.01 and 1 radians/second, greater than 8.

International Publication No. WO 2005/103100 discloses a polyethylene, which comprises ethylene homopolymers and copolymers of ethylene with alpha-olefins, and has a molar mass distribution width, $M_W/M$, from 6 to 100; a density from 0.89 to 0.97 g/cm$^3$; a weight average molar mass, MM, from 5,000 g/mol to 700,000 g/mol, and has from 0.01 to 20 branches/1000 carbon atoms, and at least 0.5 vinyl groups/1000 carbon atoms. From 5-50 weight percent of the polyethylene having the lowest molar masses have a degree of branching of less than 10 branches/1000 carbon atoms, and from 5-50 weight percent of the polyethylene having the highest molar masses have a degree of branching of more than 2 branches/1000 carbon atoms.

International Publication No. 2001/14122 (see also EP1204523B1) discloses a bimodal HDPE for the production, by blow molding, of medium to large volume containers having improved environmental stress crack resistance. The bimodal HDPE is disclosed as preferably having a density of 940 to 970 kg/m$^3$, a weight average molecular weight of 200,000 to 450,000 D, a number average molecular weight of 6,000 to 20,000 D, a molecular weight distribution of 15 to 55, a MFR21 of 2 to 12 g/10 min, a tensile modulus at least 900 mPa, and a comonomer content of 0.5 to 10 weight percent.

European Patent Application No. 1333040A2 discloses a polyolefin comprising a high molecular weight component (HMW) and a low molecular weight component (LMW), the LMW component forming 20 to 80 weight percent of the polyolefin, and the HMW component forming 15 to 75 weight percent of the polyolefin, and having an Mw/Mn of less than 10. The polyolefin has a melt strength greater than $[0.024\times(20,000+\eta_{0.05})^{0.5}]-2.6$ (where $\eta_{0.05}$ is the melt viscosity (Ns/m$^2$) at a shear rate of 0.05 s$^{-1}$); and the ratio of peak molecular weight of the high MW component over that of the low MW component is above 2.

European Patent Application No. 1319685A1 discloses a process for the preparation of polyethylene resins having a multimodal molecular weight distribution that comprises the steps of: (i) providing a first high molecular weight, metallocene-produced, linear low density polyethylene (mLLDPE) resin having a density from 0.920 to 0.940 g/cm$^3$, and a HLMI from 0.05 to 2 g/10 min; (ii) providing a second high density polyethylene (HDPE), prepared either with a Ziegler-Natta or with a chromium based catalyst, said polyethylene having a density ranging from 0.950 to 0.970 g/cm$^3$, and a HLMI from 5 to 100 g/10 min; (iii) physically blending together the first and second polyethylenes to form a polyethylene resin having a semi-high molecular weight, a broad or multimodal molecular weight distribution, a density ranging from 0.948 to 0.958 g/cm$^3$, and a HLMI from 2 to 20 g/10 min.

U.S. Pat. No. 6,749,914 discloses a melt blended HDPE for pipe and fitting material, and which has a density in the range of 0.945 to 0.955 g/cc, values of melt flow index, according to ASTM D1238, less than 0.4, and has enhanced physical properties and process characteristics.

U.S. Pat. No. 4,525,322 disclose polyethylene blends for blow molding processes, and which comprise from 12 to 25 weight percent of a high molecular weight component, 5 to 83 weight percent of a medium molecular weight component, and 5 to 83 weight percent of the low molecular weight component. The ratio of high molecular weight to medium molecular weight is greater than, or equal to, 1.7, and the ratio of medium molecular weight to low molecular weight is greater than, or equal to, 1.7, and the blend has a melt index in the range of 0.01 to 2.0.

International Publication No. WO 00/18813 discloses a process for the preparation of polyethylene resins having a multimodal molecular weight distribution, and which process comprises: (i) contacting ethylene monomer and a comonomer, comprising an alpha-olefin having from 3 to 10 carbon atoms, with a first catalyst system in a first reactor, under first polymerization conditions in a slurry process, to produce a first polyethylene having a first molecular weight an HLMI of not more than 0.5 g/10 min, and a first density of not more than 0.925 g/ml; (ii) providing a second polyethylene having a second lower molecular weight and higher density than the first polyethylene; and (iii) mixing together the first and second polyethylenes to form a polyethylene resin having a multimodal molecular weight distribution.

Japanese JP2001226496A (Abstract) discloses a polyethylene resin sheet obtained from a resin composition comprising 98-55 weight percent of an ethylene homopolymer or ethylene-α-olefin copolymer having 0.93-0.97 g/cm$^3$ density, and 2-45 weight percent of an ethylene copolymer satisfying requirements of a 0.86-0.94 g/cm$^3$ density, 0.01-50 g/10 min melt flow rate, and 1.5-4.5 molecular weight distribution (Mw/Mn).

International Publication No. WO 2004/016688 discloses a polyethylene composition that has a density of 0.945 to 0.960 g/cc, and a melt flow index of 0.1 to 0.4. The composition is a melt blend of a linear low density polyethylene resin and/or a linear medium low density polyethylene resin, and a high density polyethylene resin.

International Publication No. WO 95/11264 discloses resins which are in situ catalytically produced blends of ethylene resins of broad bimodal molecular weight distribution. The resins of the invention are characterized by a blend of low molecular weight component and high molecular weight component. The resin has a molecular weight distribution, which is characterized as MFR or Mw/Mn. The bimodal molecular weight resins are disclosed as being able to be processed into films on existing equipment, and exhibit good processability in blown film production and provide film product of excellent FQR.

Additional polyethylene-based compositions are disclosed in U.S. Pat. No. 6,809,154; U.S. Pat. No. 4,617,352; U.S. Pat. No. 6,541,581; U.S. Pat. No. 6,090,893; U.S. Pat. No. 5,310,834; U.S. Pat. No. 6,649,698; U.S. Pat. No. 4,603,173; U.S. Pat. No. 7,129,296, U.S. Pat. No. 5,688,865; U.S. Publication No. 2005/0288443; U.S. Publication No. 2003/0149181; International Publication No. WO 2004/058878; International Publication No. WO 2004/058877; International Publication No. WO 2004/058876; International Publication No. WO 99/65039; and International Publication No. WO 01/79344 (see also EP1146077A); International Publication No. WO 2005/121239; International Publication No. WO 96/18677; International Publication No. WO 2004/007610; International Publication No. WO 01/14122; European Application No. 1384751A1; European Application No. 1595897A1; and European Application No. 0717055A2.

However, there remains a need for polyolefin compositions that can provide an optimized balance of stiffness, stress crack and impact resistance. This need is particularly pronounced in the fabrication of blow molded household and industrial containers, and especially in the area of reduced resin, light-weight, rigid containers. Some of these and other issues are satisfied by the following invention.

SUMMARY OF THE INVENTION

A modification in a base resin structure has been found that results in improvements in resin stiffness, stress crack resistance and impact resistance. Such modification is achieved by combining an optimum amount of high molecular weight ethylene-based interpolymer with a low molecular weight ethylene-based homopolymer or interpolymer containing low levels of one or more comonomers. The resulting polymer has an excellent balance of stiffness, as characterized by flexural modulus, toughness, as characterized by environmental stress crack resistance, and impact strength, as characterized by Izod impact.

Accordingly, the invention provides compositions for blow molding applications and other applications, where such compositions comprise a high molecular weight ethylene interpolymer component and a low molecular weight ethylene polymer component.

The invention provides a composition comprising a high molecular weight component and a low molecular weight component, and wherein the high molecular weight component comprises an ethylene interpolymer that has a density from 0.920 g/cm$^3$ to 0.950 g/cm$^3$, and an I21 from 0.05 to 1 dg/min, and wherein the low molecular weight component comprises an ethylene polymer that has density from 0.965 g/cm$^3$ to 0.985 g/cm$^3$, and an I2 from 600 to 2000 dg/min, and wherein the composition has a density from 0.950 g/cm$^3$ to 0.970 g/cm$^3$, and comprises from 45 to 80 weight percent of the high molecular component, and comprises from 20 to 55 weight percent of the low molecular weight component, and wherein the weight percentages are based on the sum weight of the high molecular weight component and the low molecular weight component.

DETAILED DESCRIPTION OF THE INVENTION

As discussed above, the invention provides a composition comprising a high molecular weight component and a low molecular weight component, and where the high molecular weight component comprises an ethylene interpolymer that has a density from 0.920 g/cm$^3$ to 0.950 g/cm$^3$, and an I21 from 0.05 to 1 dg/min, and where the low molecular weight component comprises an ethylene polymer that has density from 0.965 g/cm$^3$ to 0.985 g/cm$^3$, and an I2 from 600 to 2000 dg/min, and where the composition has a density from 0.950 g/cm$^3$ to 0.970 g/cm$^3$, and comprises from 45 to 80 weight percent of the high molecular component, and from 55 to 20 weight percent of the low molecular weight component, and wherein the weight percentages are based on the sum weight of the high molecular weight component and the low molecular weight component. In a further embodiment, the high molecular weight component comprises only the ethylene interpolymer. In another embodiment, the low molecular weight component comprises only the ethylene polymer.

In one aspect of the invention, the composition has an I21 from 3 to 15 dg/min. In another aspect of the invention, the composition comprises from 50 to 75 weight percent of the high molecular component, and from 25 to 50 weight percent of the low molecular weight component. In another aspect, the high molecular weight ethylene interpolymer has a density from 0.925 g/cm$^3$ to 0.950 g/cm$^3$. In yet another aspect, the composition has a density from 0.955 g/cm$^3$ to 0.970 g/cm$^3$. In another aspect, the high molecular weight ethylene polymer has an I21 from 0.10 to 0.50 dg/min.

In one aspect of the invention, the composition has an I$_{21}$ from 5 to 7 dg/min. In a further aspect, the composition comprises from 55 to 65 weight percent of the high molecular component, and from 35 to 45 weight percent of the low molecular weight component. In a further aspect, the composition has a density from 0.955 to 0.960 g/cc. In another aspect, the high molecular weight ethylene interpolymer has a density from 0.935 g/cm$^3$ to 0.945 g/cm$^3$. In another aspect, the high molecular weight ethylene polymer has an I$_{21}$ from 0.20 to 0.40 dg/min. In another aspect, the low molecular weight ethylene polymer has a density from 0.965 g/cm$^3$ to 0.975 g/cm$^3$. In another aspect, the low molecular weight ethylene polymer has an I$_2$ from 700 to 1150 dg/min.

In another aspect of the invention, the composition has an I$_{21}$ from 3 to 15 dg/min. In another aspect of the invention, the high molecular weight ethylene interpolymer has a molecular weight distribution, Mw/Mn, from 1.5 to 10. In yet another aspect, the low molecular weight ethylene polymer is a homopolymer. In another aspect, the high molecular weight ethylene interpolymer is an ethylene/α-olefin interpolymer. In another aspect, the α-olefin is a C$_3$-C$_{20}$ olefin, and preferably a C$_3$-C$_{10}$ olefin. In a further aspect, α-olefin is selected from the group consisting of propylene, 1-butene, 1-pentene, 1-hexene, 3-methyl-1-pentene, 4-methyl-1-pentene, 1-heptene, 1-octene, 1-nonene and 1-decene, and preferably propylene, 1-butene, 1-hexene and 1-octene.

In another aspect of the invention, the high molecular weight ethylene interpolymer is present in an amount greater than, or equal, to 55 weight percent, based on the sum weight of the high molecular weight and low molecular weight components, and/or the low molecular weight ethylene polymer is present in an amount less than, or equal to, 45 weight percent, based on the sum weight of the high molecular weight and low molecular weight components. In another aspect, the low molecular ethylene polymer has an 12 value ranging from 700 to 1,000 dg/min, or from 700 to 1,200 dg/min.

In another aspect of the invention, the low molecular weight ethylene polymer is an ethylene/α-olefin interpolymer. In another aspect, the α-olefin is a C$_3$-C$_{20}$ olefin, and preferably a C$_3$-C$_{10}$ olefin. In a further aspect, α-olefin is selected from the group consisting of propylene, 1-butene, 1-pentene, 1-hexene, 3-methyl-1-pentene, 4-methyl-1-pentene, 1-heptene, 1-octene, 1-nonene and 1-decene, and preferably propylene, 1-butene, 1-hexene and 1-octene.

The invention also provides for an article comprising at least one component formed from an inventive composition. In a further aspect, the invention provides for a blow molded article comprising at least one component formed from an inventive composition. The invention also provides for a method of forming an article, as discussed herein; for example, blow molding an inventive composition. In a further aspect, invention also provides for articles or resins having one or more of the following properties: ultimate tensile strength greater than 5000 psi, an ESCR F50 greater than 500 hours, and/or a 1 percent secant modulus greater than 190,000 psi, as described herein.

The invention also provides for methods of manufacturing the inventive compositions. In one aspect, the invention provides a method which comprises polymerizing the composition in dual reactors, and where the high molecular weight ethylene interpolymer is formed in a first reactor, and the low molecular weight ethylene polymer is formed in a second reactor. In another embodiment, the low molecular weight ethylene interpolymer is formed in a first reactor, and the high molecular weight ethylene polymer is formed in a second reactor. In a further aspect, the dual reactors are run in a series configuration. In yet another aspect, the polymerization of each component takes place in the gas phase. In another aspect, the high molecular weight component and/or the low molecular weight component is formed using a magnesium-titanium catalyst system, such as a Ziegler-Natta catalyst system. In a further aspect, the magnesium-titanium catalyst system is in spray dried form.

The invention provides ethylene polymer compositions which can be used for making blow molded articles and other products. These resins exhibit an excellent balance of stiffness, environmental stress crack resistance and impact strength. As discussed above, the compositions comprise a high molecular weight, low density ethylene interpolymer and a low molecular weight, high density ethylene polymer.

Suitable comonomers useful for interpolymers of ethylene, include, but are not limited to, ethylenically unsaturated monomers, conjugated or nonconjugated dienes or polyenes, and mixtures thereof. Examples of such comonomers include the C$_3$-C$_{20}$ α-olefins, such as, propylene, isobutylene, 1-butene, 1-pentene, 1-hexene, 3-methyl-1-pentene, 4-methyl-1-pentene, 1-heptene, 1-octene, 1-nonene, 1-decene, and preferably propylene, 1-butene, 1-hexene and 1-octene. Preferred examples of the C$_3$-C$_{20}$ α-olefins include propylene, 1-butene, 1-pentene, 1-hexene, 3-methyl-1-pentene, 4-methyl-1-pentene, 1-heptene, 1-octene, 1-nonene, and 1-decene. All individual values and subranges from 3 carbon atoms to 20 carbon atoms, are included herein and disclosed herein. Preferred comonomers include propylene, 1-butene, 1-hexene, 4-methyl-1-pentene, 1-octene and mixtures thereof. Other suitable monomers include styrene, halo-substituted styrenes, alkyl-substituted styrenes, tetrafluoroethylenes, vinylbenzocyclobutanes, butadienes, isoprenes, pentadienes, hexadienes (for example, 1,4-hexadiene), octadienes, cycloalkenes (for example, cyclopentene, cyclohexene and cyclooctene) and other naphthenics. Typically, ethylene is copolymerized with one C$_3$-C$_{20}$ α-olefin. Preferred C$_3$-C$_8$ α-olefins include, but are not limited to, propylene, 1-butene, 1-pentene, 3-methyl-1-pentene, 4-methyl-1-pentene, 1-hexene, 1-heptene, and 1-octene, and preferably propylene, 1-butene, 1-hexene and 1-octene.

In a preferred embodiment of the invention, the high molecular weight component and/or the low molecular weight component is a heterogeneously branched linear interpolymer. Such interpolymers may be prepared from Ziegler-Natta type catalyst systems. Such interpolymers are not characterized as having a substantially uniform comonomer distribution, in which substantially all of the polymer molecules have the same ethylene-to-comonomer ratio.

In another embodiment, the high molecular weight component and/or the low molecular weight component is a homogeneously branched linear or homogeneously branched substantially linear ethylene/α-olefin interpolymer, characterized as having a substantially uniform comonomer distribution.

Processes for preparing homogeneous polymers are disclosed in U.S. Pat. No. 5,206,075; U.S. Pat. No. 5,241,031; and PCT International Application WO 93/03093; each of which is incorporated, herein, by reference in its entirety. Further details regarding the production, and use, of homogeneous ethylene α-olefin copolymers are disclosed in U.S. Pat. No. 5,206,075; U.S. Pat. No. 5,241,031; PCT International Publication Number WO 93/03093; PCT International Publication Number WO 90/03414; all four of which are herein incorporated, herein, in their entireties, by reference. Homogeneous interpolymers may be prepared using a constrained geometry catalyst. Examples of constrained geometry catalysts are described in U.S. Pat. Nos. 5,272,236 and 5,278,272, each incorporated herein in its entirety by reference.

In yet other embodiments, the high molecular weight component is an ethylene/α-olefin interpolymer, characterized as having a reverse comonomer distribution, as described in U.S. Publication No. 20030055176 and U.S. Publication No. 20040198911, each incorporated herein in its entirety by reference. A higher amount of comonomer in the interpolymer component is incorporated in the high molecular weight fractions of the interpolymer composition. That is, the polymer fractions having an Mw greater than, or equal to, the average Mw of the interpolymer component, are characterized as having a higher weight average amount of comonomer than the polymer fractions having an Mw less than the average Mw of the interpolymer component.

An inventive composition may comprise a combination of two or more aspects/embodiments as described herein.

The high molecular weight component may comprise a combination of two or more aspects/embodiments as described herein.

The low molecular weight component may comprise a combination of two or more aspects/embodiments as described herein.

High Molecular Weight Ethylene Interpolymer Component

Generally, the composition contains from 45 to 80 weight percent, preferably from 50 to 75 weight percent, more preferably from 55 to 75 weight percent, and even more preferably from 55 to 70 weight percent of the high molecular ethylene interpolymer component. In another embodiment, the amount of the high molecular weight component is from 55 to 65 weight percent. All individual values and subranges from 45 to 80 weight percent, are included and disclosed herein. The weight percentages are based on the total weight of the high molecular weight and low molecular weight components.

In another embodiment, the high molecular weight component is present in an amount greater than, or equal to, 50 weight percent, preferably greater than, or equal to 55 weight percent, and more preferably greater than, or equal to 60 weight percent, based on the total weight of the high molecular weight and low molecular weight components. In another embodiment, the high molecular weight component is present in an amount less than, or equal to, 80 weight percent, preferably less than, or equal to 75 weight percent, and more preferably less than, or equal to 70 weight percent, based on the total weight of the high molecular weight and low molecular weight components.

In another embodiment, the weight average molecular weight (Mw) of the high molecular weight component is preferably from 100,000 to 500,000 g/mole, more preferably from 200,000 to 400,000 g/mole, and even more preferably from 250,000 to 350,000 g/mole. All individual values and subranges from 100,000 to 500,000 g/mole are included herein and disclosed herein.

In another embodiment, the number average molecular weight (Mn) of the high molecular weight component is preferably from 50,000 to 200,000 g/mole, more preferably from 60,000 to 150,000 g/mole, and even more preferably from 70,000 to 100,000 g/mole. All individual values and subranges from 50,000 to 200,000 g/mole are included herein and disclosed herein.

In another embodiment, the molecular weight distribution, Mw/Mn, of the high molecular weight component is preferably from 1.5 to 10, more preferably greater from 2 to 8, and even more preferably from 3 to 6, or from 4 to 6. In another embodiment, the high molecular weight component has an Mw/Mn greater than, or equal to, 2.5, preferably greater than, or equal to, 3.0, and more preferably greater than, or equal to 3.5. In another embodiment, the high molecular weight component has an Mw/Mn less than, or equal to, 6.0, preferably less than, or equal to, 5.5, and more preferably less than, or equal to 5.0. All individual values and subranges from 1.5 to 10, are included herein and disclosed herein.

In another embodiment, the density of the high molecular component is preferably from 0.920 to 0.950 g/cm$^3$, more preferably from 0.925 to 0.950 g/cm$^3$ and even more preferably from 0.930 to 0.945 g/cm$^3$. In another embodiment, the high molecular weight component has a density greater than 0.920 g/cm$^3$, preferably greater than 0.925 g/cm$^3$, and more preferably greater than 0.930 g/cm$^3$. In another embodiment, the high molecular weight component has a density less than 0.950 g/cm$^3$, preferably less than 0.945 g/cm$^3$. In another embodiment, the density is from 0.932 g/cm$^3$ to 0.942 g/cm$^3$, and all individual values and subranges from 0.920 g/cm$^3$ to 0.950 g/cm$^3$ are included herein and disclosed herein.

In another embodiment, the high molecular weight component has a high load melt index ($I_{21}$) is preferably from 0.05 to 1 dg/min, more preferably from 0.1 to 0.50 dg/min, even more preferably from 0.15 to 0.45 dg/min, and most preferably from 0.20 to 0.40 dg/min, as determined using ASTM D-1238 (190° C., 21.6 kg load). In another embodiment, the high molecular weight component has high load melt index ($I_{21}$) greater than, or equal to, 0.05 dg/min, preferably greater than, or equal to, 0.1 dg/min, and more preferably greater than, or equal to, 0.2 dg/min. In another embodiment, the high molecular weight component has high load melt index ($I_{21}$) less than, or equal to, 1 dg/min, preferably less than, or equal to, 0.9 dg/min, and more preferably less than, or equal to, 0.8 dg/min. All individual values and subranges from 0.05 to 1 dg/min, are included herein and disclosed herein.

In another embodiment, the high molecular weight component has a percent crystallinity of greater than, or equal to, 40 percent, preferably greater than, or equal to, 50 percent, and more preferably greater than, or equal to, 60 percent, as measured by DSC. Preferably, these polymers have a percent crystallinity from 40 percent to 70 percent, and all individual values and subranges from 40 percent to 80 percent are included herein and disclosed herein.

The high molecular weight component may have a combination of properties from two or more of the above embodiments.

Suitable examples of the high molecular weight component include gas-phase resins, prepared using Ziegler-Natta catalyst systems, chromium-based catalysts, single site catalysts, such as constrained geometry catalysts or metallocene-based catalysts, and post-metallocene catalysts.

Low Molecular Weight Ethylene Polymer Component

Generally, the composition contains from 20 to 55 weight percent, and preferably from 25 to 50 weight percent, more preferably from 25 to 45 weight percent, even more preferably from 30 to 45 weight percent of the low molecular weight ethylene polymer component. In another embodiment, the amount of the low molecular weight component is from 20 to 40 weight percent. In another embodiment, the amount of the low molecular weight component is from 35 to 45 weight percent. All individual values and subranges from 20 to 55 weight percent, are included and disclosed herein. The weight percentages are based on the total weight of the high molecular weight and low molecular weight components.

In another embodiment, the low molecular weight component is present in an amount greater than, or equal to, 20 weight percent, preferably greater than, or equal to 25 weight percent, and more preferably greater than, or equal to 30 weight percent, based on the total weight of the high molecular weight and low molecular weight components. In another embodiment, the low molecular weight component is present in an amount less than, or equal to, 50 weight percent, preferably less than, or equal to 45 weight percent, and more preferably less than, or equal to 40 weight percent, based on the total weight of the high molecular weight and low molecular weight components.

In another embodiment, the low molecular component has a melt index ($I_2$) of greater than, or equal, to 600 dg/min, and preferably has a melt index from 600 to 2000 dg/min, more preferably from 625 to 1500 dg/min, even more preferably from 650 to 1200 dg/min, and most preferably from 700 to 1150 dg/min. In another embodiment, the low molecular weight component has a melt index ($I_2$) from 1100 to 2000 dg/min, and preferably from 1200 to 1800 dg/min. All individual values and subranges from 600 to 2000 dg/min are included herein and disclosed herein.

In another embodiment, the low molecular weight component has a weight average molecular weight less than 100,000 g/mole. In a further embodiment, the weight average molecular weight is in the range from 2,000 to 100,000 g/mole, more preferably from 5,000 to 70,000 g/mole, and most preferably from 10,000 to 50,000 g/mole. All individual values and subranges from 2,000 g/mole to 100,000 g/mole are included herein and disclosed herein.

In another embodiment, the low molecular weight component has a number average molecular weight less than 50,000 g/mole. In a further embodiment, the number average molecular weight is in the range from 500 to 50,000 g/mole, more preferably in the range of from 1,000 to 30,000 g/mole, and most preferably in the range of from 1,500 to 20,000 g/mole. All individual values and subranges from 500 g/mole to 50,000 g/mole are included herein and disclosed herein.

In another embodiment, the low molecular weight component has a density greater than, or equal to, 0.960 g/cm$^3$. In a further embodiment, the density ranges from 0.960 to 0.987 g/cm$^3$, preferably from 0.962 to 0.985 g/cm$^3$, and more preferably from 0.965 to 0.980 g/cm$^3$. All individual values and subranges from 0.960 to 0.987 g/cm$^3$ are included herein and disclosed herein.

In another embodiment, the low molecular weight component has a percent crystallinity of greater than, or equal to, 60 percent, preferably greater than, or equal to, 65 percent, and more preferably greater than, or equal to, 70 percent, as measured by DSC. Preferably, these polymers have a percent crystallinity from 60 percent to 85 percent, and all individual values and subranges from 60 percent to 85 percent are included herein and disclosed herein.

The low molecular weight ethylene polymer component is an ethylene homopolymer or an ethylene-based interpolymer. Suitable ethylene-based interpolymers include ethylene/α-olefin interpolymers containing one or more comonomers. Such interpolymers typically will have a comonomer incorporation in the final polymer less than 1 weight percent, preferably less than 0.7 weight percent, more preferably less than 0.5 weight percent, based on the total weight of polymerizable monomer constituents. All individual values and subranges from "greater than 0" to 1 weight percent comonomer are included herein and disclosed herein.

The low molecular weight component preferably has a branching frequency of less than one branch per 1,000 carbon atoms, more preferably less than one branch per 5,000 carbon atoms, and even more preferably less than one branch per 10,000 carbon atoms. In a further embodiment, the low molecular weight component preferably has a branching frequency of less than one ethyl or butyl branch per 1,000 carbon atoms, more preferably less than one ethyl or butyl branch per 5,000 carbon atoms, and even more preferably less than one ethyl or butyl branch per 10,000 carbon atoms. The number of carbon atoms includes carbon atoms located in both the backbone segments and branches.

In another embodiment, the low molecular weight component has a molecular weight distribution, Mw/Mn, greater than, or equal to 2.0, preferably greater than, or equal to 2.5, and more preferably greater than, or equal to 3.0. In another embodiment, the low molecular weight component has a molecular weight distribution, Mw/Mn, less than, or equal to 6.0, preferably less than, or equal to 5.5, and more preferably less than, or equal to 5.0.

The low molecular weight component may have a combination of properties from two or more of the above embodiments.

Suitable examples of the low molecular weight component include gas-phase resins, prepared using Ziegler-Natta catalysts systems, chromium-based catalysts, single site catalysts, such as constrained geometry catalysts or metallocene-based catalysts, and post-metallocene catalysts.

Composition

A composition of the invention contains at least one high molecular weight ethylene interpolymer and at least one low molecular weight ethylene polymer, each as described above. In one embodiment, the composition contains greater than, or equal to, 50 weight percent of the high molecular weight ethylene interpolymer, and contains less than, or equal to, 50 weight percent of the low molecular weight ethylene polymer, based on the sum weight of these components.

In another embodiment, the composition has a high load melt index ($I_{21}$) preferably from 2 to 20 dg/min, more preferably from 3 to 15 dg/min, and even more preferably from 4 to 10 dg/min, and even more preferably from 4 to 8 dg/min, or from 4 to 7 dg/min. All individual values and subranges from 2 to 20 dg/min are included herein and disclosed herein.

In another embodiment, the composition has a high load melt index ($I_{21}$) greater than, or equal to 2, preferably greater than, or equal to 3, and more preferably greater than, or equal to 4. In another embodiment, the composition has a high load melt index ($I_{21}$) less than, or equal to 10, preferably less than, or equal to 8, and more preferably less than, or equal to 7.

In another embodiment, the composition has a melt index ($I_2$) preferably from 0.02 to 0.2 dg/min, more preferably from 0.03 to 0.1 dg/min, and even more preferably from 0.04 to 0.08 dg/min. All individual values and subranges from 0.02 to 0.2 dg/min are included herein and disclosed herein.

In another embodiment, the composition has a melt index ($I_2$) preferably from 0.05 to 0.2 dg/min, more preferably from 0.06 to 0.1 dg/min, and even more preferably from 0.06 to 0.08 dg/min. All individual values and subranges from 0.05 to 0.2 dg/min are included herein and disclosed herein.

In another embodiment, the composition has a melt index ($I_5$) preferably from 0.1 to 0.5 dg/min, more preferably from 0.15 to 0.4 dg/min, and even more preferably from 0.2 to 0.35 dg/min, or from 0.2 to 0.3 dg/min. All individual values and subranges from 0.1 to 0.5 dg/min are included herein and disclosed herein.

In another embodiment, the composition has a high melt flow ratio ($I_{21}/I_5$) preferably from 10 to 50, preferably from 12 to 40, more preferably from 15 to 35, and even more preferably from 17 to 30, and most preferably from 18 to 28. All individual values and subranges from 10 to 50 are included herein and disclosed herein.

In another embodiment, the composition has a weight average molecular weight preferably from 50,000 to 400,000 g/mole, more preferably from 60,000 to 350,000 g/mole, and even more preferably from 70,000 to 300,000 g/mole. All individual values and subranges from 50,000 to 400,000 g/mole, are included herein and disclosed herein.

In another embodiment, the composition has a number average molecular weight preferably from 5,000 to 100,000 g/mole, more preferably from 7,500 to 50,000 g/mole, and even more preferably from 10,000 to 25,000 g/mole. All individual values and subranges from 5000 to 100,000 g/mole, are included herein and disclosed herein.

In another embodiment, the composition has a molecular weight distribution, Mw/Mn, greater than 8, preferably greater than 12, more preferably greater than 16, and even more preferably greater than 18. In another embodiment, the composition has a molecular weight distribution, Mw/Mn, greater than, or equal to, 12, preferably greater than, or equal to, 15, more preferably greater than, or equal to, 18, and even more preferably greater than, or equal to, 20. In another embodiment, the composition has a molecular weight distribution, Mw/Mn, less than, or equal to, 40, preferably less than, or equal to 35, and more preferably less than, or equal to, 30. All individual values and subranges from 8 to 40 are included herein and disclosed herein.

In another embodiment, the composition has a density preferably from 0.950 to 0.975 g/cm$^3$, more preferably from 0.952 to 0.972 g/cm$^3$, and even more preferably from 0.955 to 0.970 g/cm$^3$. In another embodiment, the composition has a density greater than 0.950 g/cm$^3$, preferably greater than, or equal to 0.955 g/cm$^3$. In another embodiment, the composition has a density less than, or equal to, 0.975 g/cm$^3$, preferably less than, or equal to, 0.970 g/cm$^3$, and more preferably less than, or equal to, 0.965 g/cm$^3$. All individual values and subranges from 0.950 g/cm$^3$ to 0.975 g/cm$^3$ are included herein and disclosed herein.

In another embodiment, the composition contains greater than, or equal to, 0.1 vinyl group per 1000 carbon atoms. The number of carbon atoms includes backbone carbons and branched carbons.

In another embodiment, the composition has a molecular weight distribution, Mw/Mn, greater than 15, preferably greater than 18, more preferably greater than 20, and the high molecular weight component has a melt index, $I_{21}$ less than 1.0, preferably less than 0.5 dg/min.

In another embodiment, the composition has a molecular weight distribution, Mw/Mn, greater than 15, preferably greater than 18, more preferably greater than 20, and the low molecular weight component has a melt index, I2, greater than 600, preferably greater than 800 dg/min.

In another embodiment, the composition has melt index, $I_{21}$, less than 10 dg/min, preferably less than 8 dg/min, and the high molecular weight component has a melt index, I21 less than 1.0 dg/min, preferably less than 0.5 dg/min.

In another embodiment, the composition has melt index, $I_{21}$, less than 10 dg/min, preferably less than 8 dg/min, and the low molecular weight component has a melt index, I2, greater than 600 dg/min, preferably greater than 800 dg/min.

In another embodiment, the composition has a molecular weight distribution (Mw/Mn) greater than, or equal to, 15, preferably greater than, or equal to 18, and more preferably greater than, or equal to 20, and the high molecular weight component has a molecular weight distribution (Mw/Mn) less than, or equal to, 6, preferably less than, or equal to 5.5, and more preferably less than, or equal to, 5.

In another embodiment, the composition has a molecular weight distribution (Mw/Mn) greater than, or equal to, 15, preferably greater than, or equal to 18, and more preferably greater than, or equal to 20, and the low molecular weight component has a molecular weight distribution (Mw/Mn) less than, or equal to, 6 preferably less than, or equal to 5.5, and more preferably less than, or equal to, 5.

In another embodiment, the composition has a molecular weight distribution (Mw/Mn) greater than, or equal to, 15, preferably greater than, or equal to 18, and more preferably greater than, or equal to 20; the high molecular weight component has a molecular weight distribution (Mw/Mn) less than, or equal to 6 preferably less than, or equal to 5.5, and more preferably less than, or equal to, 5; and the low molecular weight component has a molecular weight distribution (Mw/Mn) less than, or equal to, 6, preferably less than, or equal to 5.5, and more preferably less than, or equal to, 5.

The composition may have a combination of properties from two or more of the above embodiments.

In another embodiment, the composition does not contain any additional polymeric component of higher molecular weight (Mw or Mn) compared to the molecular weight (Mw or Mn) of the high molecular weight component. In another embodiment, the high molecular weight component and the low molecular weight component comprise greater than, or equal to, 80 weight percent of the composition, preferably greater than, or equal to, 90 weight percent of the composition, and more preferably greater than, or equal to, 95 weight percent of the composition, based on the total weight of the composition.

In another embodiment, the composition does not contain a nucleating agent, such as sodium succinate, aluminum phenylacetate, or alkali metal or aluminum salts of aromatic or alicyclic carboxylic acids.

Additives may be added to the compositions of the invention as needed. These additives include, but are not limited to, antioxidants, ultraviolet light absorbers, antistatic agents, pigments, dyes, flavorants, fillers, slip agents, fire retardants, plasticizers, nucleating agents, processing aids, lubricants, stabilizers, smoke inhibitors, viscosity control agents, crosslinking agents, catalysts, boosters, tackifiers, and antiblocking agents. The resin composition, together with the desired additive or additives, and/or any other resin to be blended into the final composition, may be mixed together using devices, such as blenders and extruders, and other devices known in the art, and/or as discussed below. The choice and amount of additive(s) used, depends on the processing characteristics and final properties of the final product.

The composition may comprise a combination of two or more embodiments as described herein.

Preparation of Compositions

The inventive compositions may be prepared by a variety of methods. For example, compositions may be prepared by blending or mixing the high molecular weight ethylene interpolymer and the low molecular weight ethylene polymer in a suitable mixing device, such as a blender or extruder. Alternatively, these compositions may be prepared through polymerization reactions in either a single reactor or a plurality of polymerization reactors.

Some blending methods include, but are not limited to, blending components by means of an extruder, a kneader, or the like; dissolving the components in an appropriate solvent (for example, hydrocarbon solvent, such as, hexane, heptane, decane, cyclohexane, benzene, toluene or xylene), or a mixture of hydrocarbon solvents, followed by solvent removal; independently dissolving one or more components in an appropriate solvent, combining the resulting solutions, followed by solvent removal; and any combination of these blending methods.

For the preparation of a composition through polymerization, the polymerization may be conducted in one, or two, or more stages, under different reaction conditions to prepare the respective components. The polymer components may be mixed prior to the isolation of the product composition. If the polymerization is conducted in one reaction, two or more catalyst systems may be used to form the respective components. Alternatively, the composition may be made in situ in one or more polymerization reactors.

In one embodiment, the composition is made in a dual reactor configuration, in which the catalyst precursor and the cocatalyst are introduced in the first reactor, and the polymerizing mixture is transferred to the second reactor for further polymerization. Insofar as the catalyst system is concerned, only cocatalyst, if desired, is added to the second reactor from an outside source. Optionally the catalyst precursor may be partially activated prior to the addition to the reactor, followed by further in reactor activation by the cocatalyst.

In a preferred dual reactor configuration, a high molecular weight (low melt flow index) interpolymer is prepared in the first reactor. Alternatively, the low molecular weight copolymer can be prepared in the first reactor and the high molecular weight copolymer can be prepared in the second reactor. For purposes of the present disclosure, the reactor in which the conditions are conducive to making a high molecular weight polymer is known as the "high molecular weight reactor." Alternatively, the reactor in which the conditions are conducive to making a low molecular weight polymer is known as the "low molecular weight reactor." Irrespective of which component is made first, the mixture of polymer and an active catalyst is preferably transferred from the first reactor to the second reactor via an interconnecting device using nitrogen or second reactor recycle gas as a transfer medium.

The polymerization in each reactor is preferably conducted in the gas phase using a continuous fluidized bed process. In a typical fluidized bed reactor, the bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, that is, comonomers and, if desired, modifiers and/or an inert carrier gas.

A typical fluid bed system includes a reaction vessel, a bed, a gas distribution plate, inlet and outlet piping, a compressor, cycle gas cooler, and a product discharge system. In the vessel, above the bed, there is a velocity reduction zone, and, in the bed, a reaction zone. Both are above the gas distribution plate. A typical fluidized bed reactor is further described in U.S. Pat. No. 4,482,687, the entire contents of which are herein.

The gaseous feed streams of ethylene, other gaseous alpha-olefins, and hydrogen, when used, are preferably fed to the reactor recycle line, as well as liquid alpha-olefins and the cocatalyst solution. Optionally, the liquid cocatalyst can be fed directly to the fluidized bed. The partially activated catalyst precursor is preferably injected into the fluidized bed as a mineral oil slurry. Activation is generally completed in the reactors by the cocatalyst. The product composition can be varied by changing the molar ratios of the monomers introduced into the fluidized bed. The product is continuously discharged in granular or particulate form from the reactor as the bed level builds up with polymerization. The production rate is controlled by adjusting the catalyst feed rate and/or the ethylene partial pressures in both reactors.

A preferred mode is to take batch quantities of product from the first reactor, and transfer these to the second reactor using the differential pressure generated by the recycle gas compression system. A system similar to that described in U.S. Pat. No. 4,621,952, the entire contents of which are herein, is particularly useful.

The pressure is about the same in both the first and second reactors. Depending on the specific method used to transfer the mixture of polymer and contained catalyst from the first reactor to the second reactor, the second reactor pressure may be either higher than or somewhat lower than that of the first. If the second reactor pressure is lower, this pressure differential can be used to facilitate transfer of the polymer catalyst mixture from Reactor 1 to Reactor 2. If the second reactor pressure is higher, the differential pressure across the cycle gas compressor may be used as the motive force to move polymer. The pressure, that is, the total pressure in either reactor, can be in the range of 200 to 500 psig (pounds per square inch gauge), and is preferably in the range of 280 to 450 psig. The ethylene partial pressure in the first reactor can be in the range of 10 to 150 psig, and is preferably in the range of 20 to 80 psig, and more preferably is in the range of 25 to 60 psig. The ethylene partial pressure in the second reactor is set according to the amount of copolymer it is desired to produce in this reactor to achieve the split mentioned above. It is noted that increasing the ethylene partial pressure in the first reactor leads to an increase in ethylene partial pressure in the second reactor. The balance of the total pressure is provided by alpha-olefin other than ethylene and an inert gas such as nitrogen. Other inert hydrocarbons, such as an induced condensing agent, for example, isopentane, hexane, also contribute to the overall pressure in the reactor according to their vapor pressure under the temperature and pressure experienced in the reactor.

The hydrogen:ethylene mole ratio can be adjusted to control average molecular weights. The alpha-olefins (other than ethylene) can be present in a total amount of up to 15 percent by weight of the copolymer and, if used, are preferably included in the copolymer in a total amount of 0.5 to 10 percent by weight, or more preferably 0.8 to 4 percent by weight, based on the weight of the copolymer.

The residence time of the mixture of reactants including gaseous and liquid reactants, catalyst, and resin, in each fluidized bed, can be in the range of 1 to 12 hours, and is preferably in the range of 1.5 to 5 hours.

The reactors can be run in the condensing mode, if desired. The condensing mode is described in U.S. Pat. Nos. 4,543,399; 4,588,790; and 5,352,749, the entire contents of which are herein.

Typical transition metal catalyst systems, which can be used to prepare the blend, are magnesium/titanium based catalyst systems, which can be exemplified by the catalyst system described in U.S. Pat. No. 4,302,565; vanadium based catalyst systems such as those described in U.S. Pat. Nos. 4,508,842; 5,332,793; 5,342,907; and 5,410,003; a chromium based catalyst system such as that described in U.S. Pat. No. 4,101,445; and a single site catalyst system such as those described in U.S. Pat. Nos. 4,937,299; 5,317,036; and 5,527,752. Each of these patents is incorporated herein in its entirety by reference. Catalyst systems, that use chromium or molybdenum oxides on silica-alumina supports, are also useful. Preferred catalyst systems for preparing the components for the blends of this invention are Ziegler-Natta catalyst systems and single site catalyst systems.

In some embodiments, preferred catalysts used in the process to make the compositions of the present invention are of the magnesium/titanium type. In particular, for the present gas phase polymerizations, the catalyst is made from a precursor comprising magnesium and titanium chlorides in an electron donor solvent. This solution is often either deposited on a porous catalyst support, or a filler is added, which, on subsequent spray drying, provides additional mechanical strength to the particles. The solid particles from either support methods are often slurried in a diluent producing a high viscosity mixture, which is then used as catalyst precursor. Exemplary catalyst types are described in U.S. Pat. Nos. 6,187,866 and 5,290,745, the entire contents of both of which are herein. Precipitated/crystallized catalyst systems such as those described in U.S. Pat. Nos. 6,511,935 and 6,248,831, the entire contents of both of which are herein, may also be used.

The term "catalyst precursor" as used herein means a mixture comprising titanium and magnesium compounds and a Lewis Base electron donor. Preferably the catalyst precursor has the formula $Mg_d Ti(OR)_e X_f (ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >2 and up to 1.5*d+3. It is prepared from a titanium compound, a magnesium compound, and an electron donor.

The electron donor is an organic Lewis base, liquid at temperatures in the range of 0° C. to 200° C., in which the magnesium and titanium compounds are soluble. The electron donor compounds are sometimes also referred to as Lewis bases. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While a large excess of electron donor may be used initially to provide the reaction product of titanium compound and electron donor, the final catalyst precursor contains 1 to 20 moles of electron donor per mole of titanium compound and preferably 1 to 10 moles of electron donor per mole of titanium compound.

Since the catalyst will act as a template for the growth of the polymer, it is essential that the catalyst precursor be converted into a solid. It is also essential that the resultant solid has the appropriate particle size and shape to produce polymer particles with relatively narrow size distribution, low amounts of fines and good fluidization characteristics. Although this solution of Lewis Base, Magnesium and Titanium compounds may be impregnated into a porous support and dried to form a solid catalyst, it is preferred that the solution be converted into a solid catalyst via spray drying. Each of these methods thus forms a "supported catalyst precursor." Suitable sprayed dried catalysts systems are described in International Publication No. WO 2006/023057, incorporated herein in its entirety by reference.

The spray dried catalyst product is then preferentially placed into mineral oil slurry. The viscosity of the hydrocarbon slurry diluent is sufficiently low so that the slurry can be conveniently pumped through the pre-activation apparatus and eventually into the polymerization reactor. The catalyst is fed using a slurry catalyst feeder. A progressive cavity pump such as a Moyno pump is typically used in commercial reaction systems while a dual piston syringe pump is typically used in pilot scale reaction systems, where the catalyst flows are $\leq 10$ cm$^3$/hour of slurry.

A cocatalyst, or activator, is also fed to the reactor to effect the polymerization. Complete activation by additional cocatalyst is required to achieve full activity. The complete activation normally occurs in the polymerization reactor although the techniques taught in EP1200483 may also be used.

The cocatalysts, which are reducing agents, conventionally used are comprised of aluminum compounds, but compounds of lithium, sodium and potassium, alkaline earth metals as well as compounds of other earth metals than aluminum are possible. The compounds are usually hydrides, organometal or halide compounds. Butyl lithium and dibutyl magnesium are examples of useful compounds of other than aluminum.

An activator compound, which is generally used with any of the titanium based catalyst precursors, can have the formula $AlR_a X_b H_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. Examples are diethylaluminum chloride and tri-n-hexylaluminum. About 0.10 to about 10 moles, and preferably 0.15 to 2.5 moles, of activator are used per mole of electron donor. The molar ratio of activator to titanium is in the range of 1:1 to 10:1, and is preferably in the range of 2:1 to 5:1.

The hydrocarbyl aluminum cocatalyst can be represented by the formula $R_3Al$ or $R_2AlX$, wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexyl-aluminum, di-isobutyl-aluminum hydride, dihexylaluminum hydride, di-isobutyl-hexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators as are cocatalysts. For variations, see, for example, U.S. Pat. No. 5,106,926, incorporated herein by reference in its entirety. The cocatalyst is preferably added separately neat or as a solution in an inert solvent, such as isopentane, to the polymerization reactor at the same time as the flow of ethylene is initiated.

In those embodiments that use a support, the precursor is supported on an inorganic oxide support such as silica, aluminum phosphate, alumina, silica/alumina mixtures, silica that has been modified with an organoaluminum compound such as triethyl aluminum, and silica modified with diethyl zinc. In some embodiments silica is a preferred support. A typical support is a solid, particulate, porous material essentially inert to the polymerization. It is used as a dry powder having an average particle size of 10 to 250 microns and preferably 30 to 100 microns; a surface area of at least 200 square meters per gram and preferably at least about 250 square meters per gram; and a pore size of at least about 100 angstroms and preferably at least about 200 angstroms. Generally, the amount of support used is that which will provide 0.1 to 1.0 millimole of titanium per gram of support and preferably 0.4 to 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

While the polyethylene blend of subject invention is preferably produced in the gas phase by various low pressure processes. The blend may also be produced in the liquid phase in solutions or slurries by conventional techniques, again at low pressures. Low pressure processes are typically run at pressures below 1000 psi whereas high pressure processes are typically run at pressures above 15,000 psi.

The inventive compositions may also be prepared in a single reactor using a mixed catalyst. In such mixed catalyst systems, the catalyst composition may include a combination of two or more Ziegler-Natta catalysts, two or more metallocene-based catalysts such as those described in U.S. Pat. Nos. 4,937,299; 5,317,036; and 5,527,752 the entire contents of each are incorporated herein by reference in their entirety, or a combination of Ziegler-Natta and metallocene catalysts. In some embodiments, a dual site or multi site metallocene catalyst may be used.

Applications of Compositions of the Invention

The inventive compositions have excellent moldability, and can be molded into various articles (for example, cans for industrial chemicals, drums, bottles, tanks, inflation films and pipes), through various molding (or forming) methods, such as, blow molding, vacuum or pressure forming, inflation molding, extrusion molding and expansion molding. The molded articles thus produced, for example, cans for industrial chemicals, drum, tanks, and bottles, are excellent in mechanical strength as well as in rigidity.

The compositions of the invention are particularly useful for blow molding operations, however, they can also be used in various injection molding processes, rotomolding processes, thermoforming processes, injection blow molding, injection stretch blow molding, compression blow forming, extrusion foaming, and various film processes. Thus articles prepared by all of these processes can be formed from the compositions of the invention. In particular, some inventive articles include 55 gallon drums, automotive fuel tanks and storage tanks.

Other fabricated articles include sheet, monotape, monofilament, foams, fibers and films. The films may be monolayer or multilayer films. The film may be coextruded with the other layer(s) or the film can be laminated onto another layer(s). If the film is a coextrusion of two or more layers, the film may still be laminated to additional layers of packaging materials, depending on the other physical requirements of the final film. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

The invention provides for an article comprising at least one component formed from an inventive composition. In a preferred embodiment, the article is an extrusion blow molded article.

DEFINITIONS

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (for example, 1.1, 1.5, etc.), one unit is considered to be 0.0001, 0.001, 0.01 or 0.1, as appropriate. For ranges containing single digit numbers less than ten (for example, 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to melt index, weight average molecular weight, number average molecular weight, molecular weight distribution (Mw/Mn), percent crystallinity, percent comonomer, number of carbon atoms in the comonomer, and other properties.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "ethylene polymer," as used herein, refers to a polymer formed from predominantly (greater than 50 mole percent) ethylene monomeric units. Mole percentage is based on the total moles of polymerizable monomers. An ethylene interpolymer would also contain predominantly (greater than 50 mole percent) ethylene monomeric units.

The terms "blend" or "polymer blend," as used herein, mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and other methods known in the art.

The term "substantially uniform comonomer distribution" is used herein to mean that comonomer content of the polymer fractions across the molecular weight range of the polymer component vary by less than 10 weight percent, preferably less than 8 weight percent, more preferably less than 5 weight percent, and most preferably less than 2 weight percent.

The term "reverse comonomer distribution" is used herein to mean that across the molecular weight range of the polymer component, comonomer contents for the various polymer fractions are not substantially uniform, and the higher molecular weight fractions thereof, have proportionally higher comonomer contents. Both a substantially uniform comonomer distribution and a reverse comonomer distribution can be determined using fractionation techniques, such as, gel permeation chromatography-differential viscometry (GPC-DV), temperature rising elution fraction-differential viscometry (TREF-DV) and cross-fractionation techniques. Comonomer distributions can also be determined by GPC-FTIR techniques.

The terms "homogeneous" and "homogeneously-branched" are used in reference to an ethylene/α-olefin polymer (or interpolymer), in which the comonomer is randomly distributed within a given polymer molecule, and substantially all of the polymer molecules have the same ethylene-to-comonomer ratio. The homogeneously branched ethylene interpolymers include linear ethylene interpolymers, and substantially linear ethylene interpolymers.

Included amongst the homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes as described, for example, by Elston in U.S. Pat. No. 3,645,992. Commercial examples of homogeneously branched linear ethylene/α-olefin interpolymers include TAFMER™ polymers supplied by the Mitsui Chemical Company and EXACT™ polymers supplied by ExxonMobil Chemical Company.

The substantially linear ethylene interpolymers used in the present invention are described in U.S. Pat. Nos. 5,272,236; 5,278,272; 6,054,544; 6,335,410 and 6,723,810; the entire contents of each are herein. The substantially linear ethylene interpolymers are those in which the comonomer is randomly distributed within a given interpolymer molecule, and in which substantially all of the interpolymer molecules have the same ethylene/comonomer ratio within that interpolymer.

In addition, the substantially linear ethylene interpolymers are homogeneously branched ethylene polymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 total carbons (including both backbone and branch carbons) to 3 long chain branches per 1000 total carbons.

Some substantially linear polymers may be substituted with 0.01 long chain branches per 1000 total carbons to 1 or 0.5 long chain branch per 1000 total carbons, more preferably from 0.05 long chain branches per 1000 total carbons to 1 or 0.5 long chain branch per 1000 total carbons, and especially from 0.3 long chain branches per 1000 total carbons to 1 or 0.5 long chain branch per 1000 total carbons.

Commercial examples of substantially linear polymers include the ENGAGE™ polymers (previously DuPont Dow Elastomers L.L.C., now The Dow Chemical Company), and AFFINITY™ polymers (The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

Test Procedures

GPC Molecular Weight Determination

Polymer molecular weight was characterized by high temperature triple detector gel permeation chromatography (3D-GPC). The chromatographic system consisted of a Waters (Millford, Mass.) "150° C. high temperature" chromatograph, equipped with a Precision Detectors (Amherst, Mass.) 2-angle laser light scattering detector, Model 2040, and a 4-capillary differential viscometer detector, Model 150R, from Viscotek (Houston, Tex.). The 15° angle of the light scattering detector was used for calculation purposes.

Concentration was measured via an infra-red detector (IR4) from PolymerChar, Valencia, Spain.

Data collection was performed using Viscotek TriSEC software version 3 and a 4-channel Viscotek Data Manager DM400. The system was equipped with an on-line solvent degas device from Polymer Laboratories. The carousel compartment was operated at 140° C., and the column compartment was operated at 150° C. The columns were four Shodex HT 806M 30 cm, 13 micron columns, and one Shodex HT803M 15 cm, 12 micron column. The polymer solutions were prepared in both 1,2,4 trichlorobenzene (TCB) and decahydronapthalene (decalin). The samples were prepared at a concentration of 0.1 grams of polymer in 50 ml of solvent. The chromatographic solvent and the sample preparation solvent contained 200 ppm of butylated hydroxytoluene (BHT). Both solvent sources were nitrogen sparged. Polyethylene samples were stirred gently at 160° C. for 4 hours. The injection volume was 200 μl, and the flow rate was 0.67 ml/minute.

Calibration of the GPC column set was performed with 21 narrow molecular weight distribution polystyrene standards. The molecular weights of the standards ranged from 580 to 8,400,000, and were arranged in 6 "cocktail" mixtures, with at least a decade of separation between individual molecular weights.

The polystyrene standard peak molecular weights were converted to polyethylene molecular weights using the following equation (as described in Williams and Ward, J. Polym. Sci., Polym. Let., 6, 621 (1968)):

$$M\text{polyethylene} = A \times (M\text{polystyrene})^B \qquad (1),$$

where M is the molecular weight, A has a value of 0.431 and B is equal to 1.0.

A fifth order polynomial was used to fit the respective polyethylene-equivalent calibration points.

The total plate count of the GPC column set was performed with Eicosane (prepared at 0.04 g in 50 milliliters of TCB, and dissolved for 20 minutes with gentle agitation.) The plate count and symmetry were measured on a 200 microliter injection according to the following equations:

$$\text{PlateCount} = 5.54 * (RV \text{ at Peak Maximum}/(\text{Peak width at } \frac{1}{2} \text{ height}))^2 \quad (2),$$

where RV is the retention volume in milliliters, and the peak width is in milliliters.

$$\text{Symmetry} = (\text{Rear peak width at one tenth height} - RV \text{ at Peak maximum})/(RV \text{ at Peak Maximum} - \text{Front peak width at one tenth height}) \quad (3),$$

where RV is the retention volume in milliliters, and the peak width is in milliliters.

The Systematic Approach for the determination of multi-detector offsets was done in a manner consistent with that published by Balke, Mourey, et. Al (Mourey and Balke, Chromatography Polym. Chpt 12, (1992)) (Balke, Thitiratsakul, Lew, Cheung, Mourey, Chromatography Polym. Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used for the determination of the molecular weight, was obtained from the sample infra-red area, and the infra-red detector calibration from a linear polyethylene homopolymer of 115,000 molecular weight. The chromatographic concentrations were assumed low enough to eliminate addressing 2nd Virial coefficient effects (concentration effects on molecular weight).

The calculations of Mn and Mw were based on GPC results using the IR4 detector were determined from the following equations:

$$\overline{Mn} = \frac{\sum_i IR_i}{\sum_i (IR_i / Mcalibration_i)}, \quad (4)$$

$$\overline{Mw} = \frac{\sum_i (IR_i * Mcal_i)}{\sum_i IR_i}, \quad (5)$$

where equations 4 and 5 are calculated from polymers prepared in solutions of TCB.

The calculations of Mz and Mz+1 were done with the method proposed by Yau and Gillespie, Polymer, 42, 8947-8958 (2001), and determined from the following equations:

$$\overline{Mz} = \frac{\sum_i (LS_i * Mcalibration_i)}{\sum_i (LS_i)}, \quad (6)$$

$$\overline{Mz+1} = \frac{\sum_i (LS_i * Mcalibration_i^2)}{\sum_i (LS_i * Mcalibration_i)}, \quad (7)$$

where $LS_i$ is the 15 degree LS signal, and the Mcalibration is as described previously using the method of Williams and Ward where equations 6 and 7 are measured from the polymer solutions prepared in decalin.

In order to monitor the deviations over time, which may contain an elution component (caused by chromatographic changes) and a flow rate component (caused by pump changes), a late eluting narrow peak is generally used as a "marker peak". A flow rate marker was therefore established based on decane flow marker dissolved in the eluting sample. This flow rate marker was used to linearly correct the flow rate for all samples by alignment of the decane peaks. Any changes in the time of the marker peak are then assumed to be related to a linear shift in both flow rate and chromatographic slope.

The preferred column set is of 13 micron particle size and "mixed" porosity to adequately separate the highest molecular weight fractions appropriate to the claims.

The plate count for the chromatographic system (based on eicosane as discussed previously) should be greater than 32,000, and symmetry should be between 1.00 and 1.12.

Differential Scanning Calorimetry (DSC)

DSC results were generated using a TA Instruments Model Q1000 DSC, equipped with an RCS (refrigerated cooling system) cooling accessory and an auto sampler. A nitrogen purge gas flow of 50 ml/min was used throughout. The sample was pressed into a thin film, using a press at 175° C. and 1500 psi (10.3 MPa) maximum pressure for about 15 seconds, then air-cooled to room temperature at atmospheric pressure. About 3 to 10 mg of material was then cut into a 6 mm diameter disk using a paper hole punch, and weighed to the nearest 0.001 mg. The disk was placed in a light aluminum pan (about 50 mg weight) and then crimped shut. The sample was thermally treated using the following temperature profile: (1) the sample was rapidly heated to 180° C., and held isothermal for 3 minutes in order to remove any previous thermal history, (2) the sample was then cooled to −40° C. at a 10° C./min cooling rate, and was held at −40° C. for 3 minutes, (3) the sample was then heated to 150° C. at 10° C./min heating rate. The cooling curve and second heating curve were recorded.

The percent crystallinity is calculated by dividing the heat of fusion ($H_f$), determined from the second heat curve, by a theoretical heat of fusion of 292 J/g for PE, and multiplying this quantity by 100 (for example, percent cryst.=($H_f$/292 J/g)×100).

Melt Index and Density

Melt index, $I_2$, in dg/min, was measured using ASTM D-1238-99, Condition 190° C./2.16 kg load (note $I_2=I_{2.16}$).

The melt index "$I_5$" refers to a melt index, in dg/min, measured using ASTM D-1238-99, Condition 190° C./5.0 kg load.

The high load melt index, HLMI or $I_{21}$, refers to a melt index, in dg/min, measured using ASTM D-1238-99, Condition 190° C./21.6 kg load (note $I_{21}=I_{21.6}$).

Resin density (g/cm$^3$) is measured by the Archimedes displacement method, ASTM D-792-00 Method B.

Izod Impact

The Izod impact measurement was carried out on notched compression molded plaques in accordance with ASTM D 256-97, Method A, at room temperature and −40° C. The samples were compression molded in accordance with ASTM D 1928-96.

Rheology

Resin was compression molded into a disk for rheology measurement. The disks were prepared by pressing the samples into 0.071" (1.8 mm) thick plaques, which were subsequently cut into one inch disks. The compression molding procedure was as follows: 365° F. (185° C.) for 5 minutes at 100 psi; 365° F. for 3 minutes at 1500 psi; and cooling at 27° F./min to ambient temperature.

The resin rheology was measured on the ARES I (Advanced Rheometric Expansion System) Rheometer, S/N 714806. The ARES is a strain controlled rheometer. A rotary actuator (servomotor) applied a shear deformation in the form of strain to the sample. In response, the sample generated a torque, which was measured by a transducer. Strain and torque were used to calculate dynamic mechanical properties, such as modulus and viscosity. The viscoelastic properties of the sample were measured in the melt using a parallel plate set up, at constant strain (5 percent) and temperature (190° C.), and as a function of varying frequency (0.01 to 500 sec$^{-1}$). The storage modulus (G'), loss modulus (G"), tan delta, and complex viscosity ($\eta^*$) of the resin were determined using Rheometrics Orchestrator software (v. 6.5.8).

Tensile Impact

The tensile impact measurement was carried out on compression molded plaques in accordance with ASTM D 1822-99. The samples were compression molded in accordance with ASTM D 1928-96.

Environmental Stress Crack Resistance (ESCR)

The resin environmental stress crack resistance (ESCR) was measured in accordance with ASTM-D 1693-01, Method B. In accordance with this test, the susceptibility of a resin to mechanical failure by cracking is measured under constant strain conditions, and in the presence of a crack accelerating agent, such as a soap or other wetting agent. Measurements were carried out on notched specimens, in a 10 percent, by volume, Igepal CO-630 (vendor Rhone-Poulec, N.J.) aqueous solution, maintained at 50° C. Ten specimens were evaluated per measurement. The ESCR value of the resin was reported as F50, the calculated 50 percent failure time from the probability graph.

Flexural and Secant Modulus Properties

The resin stiffness was characterized by measuring the Flexural Modulus and Secant Modulus at a test speed of 0.5 inch/min (13 mm/min) per ASTM D 790-99 Method B. The specimens were compression molded according to ASTM D-4703-00 Annex 1 with a 5 min initial heating period at about 190° C. and a 15° C./min cooling rate per Procedure C. The specimen was cooled to 45° C. in the press with continued cooling until "cool to the touch".

Tensile Properties

Tensile strength at yield and ultimate tensile strength were measured according to ASTM D-638-03. Both measurements were performed at 23° C. on rigid type IV specimens which were compression molded per ASTM D 4703-00 Annex A-1 with a 5 min initial heating period at about 190° C. and a 15° C./min cooling rate per Procedure C. The specimen was cooled to 45° C. in the press with continued cooling until "cool to the touch".

EXPERIMENTAL

Resin Preparation

Throughout these experiments the following catalyst systems were used. Each catalyst, described by the designation UCAT™, is trademarked and is property of Union Carbide Corporation, a subsidiary of The Dow Chemical Company.

UCAT™ J—Magnesium-Titanium catalyst system. The catalyst is sprayed dried from a THF slurry to form solid particles. A fused silica may be included in the slurry as a morphology controlling agent.

The inventive composition was prepared in the gas phase using a UCAT™ J in a dual reactor. The resulting polymer was stabilized with calcium stearate (600 ppm), IRGA-NOX™ 1010 (1000 ppm) and IRGAFOS™ 168 (1000 ppm), and then pelletized by melt extrusion. Antioxidants IRGA-NOX™ 1010 and IRGAFOS™ 168 are available from Ciba-Geigy Corporation.

The average reactor conditions are shown in Table 1. In the case of the HMW reactor, slight variations in the C2 partial pressure, H2/C2 and C6/C2 ratios were due to minor variations in catalyst, reactor/feed impurities, and cycle gas analysis. In the polymerization of the LMW component, the temperature and H2/C2 ratio were set for the product. In this instance no fresh hexene was fed to the LMW reactor. Resin properties are shown in Table 2.

TABLE 1

| REACTION CONDITIONS | First Reactor (HMW) | Second Reactor (Blend) |
|---|---|---|
| Temperature, ° C. | 75.0 | 109.9 |
| Total Reactor Pressure, psig | 299.2 | 363.3 |
| C2 Partial Pressure, psia | 29.5 | 74.1 |
| H2/C2 Molar Ratio | 0.0585 | 1.80 |
| C6/C2 Molar Ratio | 0.0100 | 0.0000* |
| Catalyst | UCAT(TM) J | |
| Cocatalyst | Triethylaluminum | Triethylaluminum |
| Residence Time, hr | 2.5 | 3.6 |

*The only potential hexene in the LMW reactor derives from hexene dissolved in the resin upon transfer from the HMW reactor the LMW reactor. However, for this example, a cycle gas analyzer did not measure any hexene in the LMW reactor.

TABLE 2

Resin Properties

| | High Molecular Weight Component | Low Molecular Weight Component | Blend Inv. Ex. #1 |
|---|---|---|---|
| Density (g/cm$^3$) | 0.934-0.940 | Approx. 0.970$^a$ | 0.955-0.959 |
| I$_{21}$ (dg/min) | 0.25-0.35 | | 5.2-6.6 |
| I$_2$ (dg/min) | | 800-1000$^b$ | |
| HMW Split* | 55-65 wt percent | | |
| Comonomer | 1-hexene | | |
| Polymer Type | heterogeneously branched linear | | |
| GPC Data | | | |
| Mn | 89,620 | 5,460$^c$ | 11,200 |
| Mw | 332,550 | 17,430$^c$ | 211,700 |
| Mw/Mn | 3.7 | 3.2$^c$ | 18.9 |
| Mz | 945,000 | | 892,300 |
| Mz + 1 | 1,451,500 | | 1,427,000 |
| Mz/Mw | 2.27 | | |

HMW Split* = (HMW reactor production rate)/(HMW reactor production rate + LMW reactor production rate).
$^{a,b,c}$LMW density, melt index (I$_2$) and GPC data were measured on a LMW component prepare separately under the same, or substantially the same, reaction conditions, as the reactor blend. These properties may also be determined, by those skilled in the art, using appropriate calculations based on reaction conditions.

Mechanical and rheological properties of additional two inventive compositions and four comparative resins are shown in Table 3.

Comparative example 1 is a unimodal Dow UNIVAL™ DMDC 6150 NT7 resin.

Comparative example 2 is a bimodal Dow CONTINUUM™ DGDA 2490 resin.

Comparative example 3 is an EMCC PAXON™ HYA 021L resin.

Comparative example 4 is a Nova NOVAPOL® HB W555A resin.

TABLE 3

Mechanical and Rheological Properties

| | Comp. Ex. #1 | Comp. Ex. #2 | Comp. Ex. #3 | Comp. Ex. #4 | Inventive Ex. #2 | Inventive Ex. #3 |
|---|---|---|---|---|---|---|
| Type | unimodal | bimodal | | | bimodal | bimodal |
| Spot Sample Data | | | | | | |
| HMW component $I_{21}$ (dg/min) | | | | | 0.28 | 0.28 |
| HMW component density (g/cm$^3$) | | | | | 0.9366 | 0.9363 |
| HMW Split (wt percent) | | | | | 68 | 65 |
| Overall $I_{21}$ (dg/min) | | | | | 5.89 | 7.70 |
| Overall $I_5$ (dg/min) | | | | | 0.25 | 0.31 |
| Overall $I_2$ (dg/min) | | | | | 0.06 | 0.08 |
| Overall density (g/cm$^3$) | | | | | 0.9563 | 0.9570 |
| Compounded Sample Data* | | | | | | |
| Density (g/cm$^3$) | 0.9545 | 0.9495 | 0.9535 | 0.9547 | 0.9574 | 0.9589 |
| $I_{21}$ (dg/min) | 5.63 | 5.56 | 5.27 | 5.71 | 6.29 | 7.22 |
| $I_5$ (dg/min) | 0.16 | 0.24 | 0.14 | .20 | 0.31 | 0.29 |
| $I_2$ (dg/min) | 0.03 | 0.07 | | | 0.06 | 0.08 |
| $I_{21}/I_5$ | 36 | 23 | 37 | 28 | 20 | 25 |
| $I_{21}/I_2$ | 173 | 83 | | | 113 | 94 |
| GPC | | | | | | |
| Mn | 17,850 | | 11,980 | 13,390 | 10,840 | 10,010 |
| Mw | 293,440 | | 242,700 | 238,470 | 216,630 | 215,420 |
| Mw/Mn | 16 | | 20 | 18 | 20 | 22 |
| Mz | 1,861,800 | | 1,476,300 | 1,436,600 | 1,005,200 | 1,068,600 |
| Mz + 1 | 3,841,300 | | 3,203,300 | 3,195,400 | 2,056,700 | 2,333,600 |
| Stiffness | | | | | | |
| 1 percent Sec Modulus (psi) [kPa] | 185,563 [1,279,744] | 162,510 [1,120,759] | 162,755 [1,122,448] | 193,889 [1,337,166] | 201,218 [1,387,710] | 211,959 [1,461,786] |
| 2 percent Sec Modulus (psi) [kPa] | 153,305 [1,057,276] | 133,832 [922,979] | 134,071 [924,628] | 158,091 [1,090,283] | 164,693 [1,135,814] | 172,709 [1,191,097] |
| Flex Modulus (psi) [kPa] | 223,006 [1,537,972] | 189,723 [1,308,434] | 204,596 [1,411,007] | 245,694 [1,694,441] | 249,515 [1,720,793] | 259,800 [1,791,724] |
| Toughness | | | | | | |
| ESCR F50 10 percent Igepal (h) | 167 | >1000 | 247 | 91 | 773 | 756 |
| Izod Impact (ft · lb/in) | | | | | | |
| Average @ RT | 13.9 | 14.8 | 12.1 | 14.0 | 14.1 | 11.2 |
| Average @ −40° C. | 10.2 | 6.2 | 7.8 | 11.6 | 8.7 | 7.3 |
| Tensile Impact (ft · lb/in$^2$) | 292 | 279 | 275 | 287 | 340 | 322 |
| Tensile Properties | | | | | | |
| Ultimate Tensile Strength (psi) [kPa] | 4,233 [29,193] | | 4,471 [30,834] | 5,124 [35,338] | 5,907 [40,738] | 5,808 [40,055] |
| Yield Strain (percent) | 3.83 | | 3.89 | 3.64 | 3.27 | 3.25 |
| Yield Strength (psi) [kPa] | 3,346 [23,076] | | 2,775 [19,138] | 3,461 [23,869] | 3,712 [25,600] | 3,700 [25,517] |
| Rheology | | | | | | |
| Eta@02 (Pa · s) | 256,213 | 147,464 | 319,516 | 254,807 | 177,733 | 145,301 |
| Eta@0.02/Eta@200 | 185 | 88 | 207 | 159 | 108 | 100 |

*Stabilizers added.

SUMMARY OF RESULTS

A multimodal, high density polyethylene resin has been produced using UCAT™-J catalyst and a dual gas phase process technology. The resin has an exceptional balance of stiffness, stress crack and Izod impact resistance. The resin is especially suited for the fabrication of large size containers for example, 55 gallon drums, by the extrusion blow molding process. The exceptional balance of properties will enable replacement of traditional metal containers by plastic containers fabricated from the inventive resin. The exceptional balance of properties also enables down gauging of the container walls without loss of performance.

What is claimed is:
1. A composition consisting of a high molecular weight component and a low molecular weight component and at least one additive, and
    wherein the high molecular weight component is an ethylene interpolymer that has a density from greater than 0.930 g/cm$^3$ to 0.950 g/cm$^3$, and an $I_{21}$ from 0.05 to 1 dg/min, and wherein the low molecular weight component is an ethylene polymer that has density from 0.965 g/cm³ to 0.985 g/cm³, and an $I_2$ greater than 600 to 2000 dg/min, and wherein the composition has a density from 0.950 g/cm³ to 0.970 g/cm³ and an $I_{21}$ less than 10 dg/min, and comprises from 50 to 75 weight percent of the high molecular component, and comprises from 50 to 25 weight percent of the low molecular weight component, and wherein the weight percentages are based on the sum weight of the high molecular weight component and the low molecular weight component.

2. The composition of claim 1, wherein the composition has an $I_{21}$ from 3 to 15 dg/min.

3. The composition of claim 1, wherein the composition has a density from 0.955 g/cm³ to 0.970 g/cm³.

4. The composition of claim 1, wherein the high molecular weight ethylene polymer has an $I_{21}$ from 0.10 to 0.50 dg/min.

5. The composition of claim 1, wherein the high molecular weight ethylene interpolymer has a molecular weight distribution, Mw/Mn, from 1.5 to 10.

6. The composition of claim 1, wherein the low molecular weight ethylene polymer is a homopolymer.

7. The composition of claim 1, wherein the high molecular weight ethylene interpolymer is an ethylene/α-olefin interpolymer.

8. The composition of claim 7, wherein the α-olefin is a $C_3$-$C_{20}$ olefin.

9. The composition of claim 1, wherein the high molecular weight ethylene interpolymer is present in an amount greater than, or equal, to 55 weight percent.

10. The composition of claim 1, wherein the low molecular weight ethylene polymer is present in an amount less than, or equal to, 45 weight percent.

11. The composition of claim 1, wherein the low molecular ethylene polymer has an $I_2$ value ranging from 700 to 1,150 dg/min.

12. The composition of claim 1, wherein the low molecular weight ethylene polymer is an ethylene/α-olefin interpolymer.

13. The composition of claim 12, wherein each α-olefin is a $C_3$-$C_{20}$ olefin.

14. The composition of claim 1, wherein the high molecular weight component is present in an amount greater than, or equal to, 55 weight percent, based on the sum weight of the high molecular weight component and the low molecular weight component, and
wherein the low molecular weight component is present in an amount less than, or equal to, 45 weight percent, based on the sum weight of the high molecular weight component and the low molecular weight component.

15. The composition of claim 1, wherein the high molecular weight component has an $I_{21}$ less than 1 dg/min, and the composition has a molecular weight distribution greater than 15.

16. The composition of claim 1, wherein the low molecular weight component has an $I_2$ greater than 600 dg/min, and the composition has a molecular weight distribution greater than 15.

17. The composition of claim 1, wherein the composition has a molecular weight distribution greater than, or equal to, 15.

18. The composition of claim 1, wherein the high molecular weight component has an $I_{21}$ less than 1 dg/min, and the composition has an $I_{21}$ less than 10 dg/min.

19. The composition of claim 1, wherein the high molecular weight component has a molecular weight distribution greater than, or equal to, 3 from 2.5 to 3.7.

20. The composition of claim 1, wherein the wherein the composition has a molecular weight distribution greater than, or equal to, 15, and wherein the high molecular weight component has a molecular weight distribution less than, or equal to, 6.

21. The composition of claim 1, wherein the wherein the composition has a molecular weight distribution greater than, or equal to, 15, and wherein the low molecular weight component has a molecular weight distribution less than, or equal to, 6.

22. The composition of claim 1, wherein the wherein the composition has a molecular weight distribution greater than, or equal to, 15; the high molecular weight component has a molecular weight distribution less than, or equal to, 6; and the low molecular weight component has a molecular weight distribution less than, or equal to, 6.

23. The composition of claim 1, where the high molecular weight component and/or the low molecular weight component is formed in the presence of a spray dried magnesium-titanium catalyst system.

24. An article comprising at least one component formed from the composition of claim 1.

25. A blow molded article comprising at least one component formed from the composition of claim 1.

26. The article of claim 24, wherein the article has a 1 percent secant modulus greater than 190,000 psi.

27. The article of claim 24, wherein the article has an ESCR F50 greater than 500 hours.

28. The article of claim 24, wherein the article has an ultimate tensile strength greater than 5000 psi.

29. A method of forming an article, comprising blow molding the composition of claim 1.

30. A method of manufacturing the composition of claim 1, said method comprising polymerizing the composition in dual reactors, and wherein the high molecular weight ethylene interpolymer is formed in a first reactor of the dual reactors, and the low molecular weight ethylene polymer is formed in a second reactor of the dual reactors.

31. The method of claim 30, where the high molecular weight component and/or the low molecular weight component is formed in the presence of a spray dried magnesium-titanium catalyst system.

32. The method of claim 31, where the high molecular weight component and/or the low molecular weight component is formed from a gas phase polymerization.

33. The composition of claim 1, wherein the composition has an $I_{21}$ from 3 to 15 dg/min, and wherein the composition comprises from 50 to 75 weight percent of the high molecular component, and from 25 to 50 weight percent of the low molecular weight component.

* * * * *